(12) United States Patent
Inoue et al.

(10) Patent No.: US 7,868,985 B2
(45) Date of Patent: Jan. 11, 2011

(54) LIQUID CRYSTAL DISPLAY DEVICE WITH HIGH RESPONSE SPEED AND METHOD OF MANUFACTURING THE SAME

(75) Inventors: Daisuke Inoue, Kanagawa (JP); Shinichi Nishida, Kanagawa (JP)

(73) Assignee: NEC Corporation, Tokyo (JP)

( * ) Notice: Subject to any disclaimer, the term of this patent is extended or adjusted under 35 U.S.C. 154(b) by 129 days.

(21) Appl. No.: 12/363,973

(22) Filed: Feb. 2, 2009

(65) Prior Publication Data

US 2009/0191656 A1 Jul. 30, 2009

Related U.S. Application Data

(62) Division of application No. 10/981,598, filed on Nov. 5, 2004, now Pat. No. 7,505,105.

(30) Foreign Application Priority Data

Nov. 5, 2003 (JP) .............................. 2003-375935

(51) Int. Cl.
G02F 1/137 (2006.01)
G02F 1/1333 (2006.01)
G02F 1/1347 (2006.01)

(52) U.S. Cl. ...................... 349/141; 349/142; 349/123; 349/124; 349/125; 349/126; 349/130; 349/132; 349/34

(58) Field of Classification Search ......... 349/141–142, 349/123–126, 130, 132, 34
See application file for complete search history.

(56) References Cited

U.S. PATENT DOCUMENTS

| 5,886,762 | A | 3/1999 | Lee et al. |
| 6,111,625 | A | 8/2000 | Ohta et al. |
| 6,522,380 | B2 | 2/2003 | Lee et al. |
| 6,642,984 | B1 * | 11/2003 | Yoshida et al. ............... 349/139 |
| 6,657,699 | B2 | 12/2003 | Matsumoto |
| 6,697,142 | B2 * | 2/2004 | Ashizawa et al. ........... 349/141 |
| 7,145,622 | B2 | 12/2006 | Kataoka et al. |
| 7,164,402 | B2 | 1/2007 | Yanagawa et al. |

(Continued)

FOREIGN PATENT DOCUMENTS

JP 09-297306 11/1997

(Continued)

*Primary Examiner*—Hoan C Nguyen
(74) *Attorney, Agent, or Firm*—Young & Thompson

(57) ABSTRACT

An in-plane switching liquid crystal display device is designed in such a way that an angle defined by the lengthwise direction of a common electrode and a pixel electrode and a rubbing direction of an alignment layer is set to 10 to 20°, a cell gap d is set to 2.7 μm or smaller, the dielectric anisotropy $\Delta\in$ of a liquid crystal constituting a liquid crystal layer is set to 8 to 20, a white voltage $V_{white}$ to be applied to the pixel electrode when displaying white is set to 4 to 7 V, and the white voltage $V_{white}$ (V), the dielectric anisotropy $\Delta\in$ of the liquid crystal, the cell gap d (μm) and an interval L (μm) between the common electrode and the pixel electrode satisfy the following expression $$11.8 > \frac{V_{white}}{d^{-0.6} \times L^{0.5} \times \Delta\varepsilon^{-0.5}} > 9.8.$$

3 Claims, 7 Drawing Sheets

U.S. PATENT DOCUMENTS

2001/0043304 A1  11/2001  Matsumoto
2002/0051112 A1   5/2002  Katsura
2004/0183974 A1   9/2004  Wu et al.
2005/0146664 A1*  7/2005  Hanaoka et al. ............. 349/130

FOREIGN PATENT DOCUMENTS

JP     2000-310797    11/2000

* cited by examiner

LIQUID CRYSTAL DISPLAY DEVICE WITH HIGH RESPONSE SPEED AND METHOD OF MANUFACTURING THE SAME

BACKGROUND OF THE INVENTION

1. Field of the Invention

The present invention relates to an in-plane switching liquid crystal display device, which carries out display by controlling the alignment direction of liquid crystal molecules with an in-plane electric field parallel to a substrate surface.

2. Description of the Related Art

Due to the recent rapid technical advancement on liquid crystal display devices, there is a strong demand of achieving a video performance for liquid crystal display devices, which is as high as the video performance of CRT (Cathode-Ray Tube) display devices. Because an IPS (In-Plane Switching) liquid crystal display device, in particular, has an excellent characteristic of achieving an extremely wide viewing angle, its adaptation to TVs is rapidly spreading. The IPS liquid crystal display device is therefore demanded of an improvement on the response performance to adequately display moving pictures, or video images.

Generally, a response speed $\tau(=\tau_{on}+\tau_{off})$, which is the sum of a response time $\tau_{on}$ for a liquid crystal to switch from black display to white display and a response time $\tau_{off}$ for the liquid crystal to switch from white display to black display, is used as an index for the response performance. The relationship among the response speed $\tau$ of an IPS active matrix type liquid crystal display device and an intersubstrate gap d and the rotational viscosity coefficient $\gamma_1$ of the liquid crystal is given by the following expression 1.

$$\tau \propto d^2 \times \gamma_1 \quad \text{(Expression 1)}$$

As apparent from the expression 1, to make the response of the IPS liquid crystal display device faster, or reduce the response speed $\tau$, it is effective to reduce the intersubstrate gap d, or narrow the gap, and reduce the rotational viscosity coefficient $\gamma_1$ of the liquid crystal.

There is a liquid crystal display device, which is designed to achieve a fast response by defining the rotational viscosity coefficient $\gamma_1$ of the liquid crystal and the refractive index anisotropy $\Delta n$ of the liquid crystal (see, for example, Japanese Patent Laid-Open Publication No. 2000-310797). Japanese Patent Laid-Open Publication No. 2000-310797 describes that the response speed $\tau$ can be improved to $17 \times 10^{-3}$ sec or less on one side including the half tone response by setting $(\gamma_1/\Delta n^2)$ to 6.0 Pa·sec or less. The liquid crystal display device described in the publication achieves the improved response speed by setting the intersubstrate gap d to 3 μm and using a liquid crystal material in which the amount of the neutral material contained in the liquid crystal material is set to 40 wt % or greater and the rotational viscosity coefficient $\gamma_1$ is set to an extremely small value of 45 to 55 mPa·sec.

There is another IPS liquid crystal display device whose response speed is improved by setting the product of the intersubstrate gap d and the refractive index anisotropy $\Delta n$ of the liquid crystal ($=d \times \Delta n$) in a range of 0.2 to 0.55 μm (Japanese Patent Laid-Open Publication No. H9-297306).

The prior arts however have the following shortcomings. First, the neutral material used in the liquid crystal display device described in Japanese Patent Laid-Open Publication No. 2000-310797 has a high vapor pressure as compared with other components of the liquid crystal layer. When a liquid crystal composition containing a large amount of the neutral material is sealed into a cell in vacuum as in the ODF (One Drop Fill) system and the injection system, therefore, the neutral material is volatilized during sealing. Volatilization of a large amount of the neutral material not only changes the characteristic of the liquid crystal composition but also changes the concentration, resulting in crystallization of a liquid crystal component. If the liquid crystal composition has a large content of a single component, the compatibility of the individual components is reduced. Further, to acquire the proper dielectric anisotropy $\Delta \in$ of the liquid crystal while increasing the ratio of the neutral material, a material having a large dielectric constant and a strong polarity should be added as a liquid crystal component. Because most of such materials have high affinity to ions of Na or so, there is a possibility of generating spots, making the materials extremely difficult to use.

The angle defined by the rubbing direction and the in-plane electric field is set to 88° in the liquid crystal display device described in Japanese Patent Laid-Open Publication No. H9-297306. With such an angle, however, the torque that is applied to the liquid crystal aligned in the initial alignment direction the instant the electric field is applied is small so that fast driving cannot be achieved.

SUMMARY OF THE INVENTION

It is an object of the invention to provide an in-plane switching liquid crystal display device, which has a high response speed and a high reliability, and a method of manufacturing the liquid crystal display device.

A liquid crystal display device according to the invention comprises first and second substrates laid out in such a way as to face each other; an insulating layer provided on that surface of the first substrate which lies on the second substrate side; a common electrode formed on the insulating layer; a pixel electrode formed on the insulating layer as so to be in parallel to the common electrode; a first alignment layer provided so as to cover the insulating layer, the pixel electrode and the common electrode and subjected to an aligning treatment in a direction which forms an angle of 10 to 20° with a lengthwise direction of the pixel electrode and the common electrode; a second alignment layer provided on that surface of the second substrate which lies on the first substrate side and subjected to an aligning treatment in a direction which forms an angle of 10 to 20° with the lengthwise direction of the pixel electrode and the common electrode; and a liquid crystal layer arranged between the first alignment layer and the second alignment layer and comprised of a liquid crystal having a dielectric anisotropy of 8 to 20. A distance between the first alignment layer and the second alignment layer is equal to or less than 2.7 μm, a voltage of 4 to 7 V is applied to the pixel electrode when displaying white, and the following expression 2 is satisfied.

$$11.8 > \frac{V_{white}}{d^{-0.6} \times L^{0.5} \times \Delta \varepsilon^{-0.5}} > 9.8 \quad \text{(Expression 2)}$$

In the expression 2, $V_{white}$ (V) is the voltage to be applied to the pixel electrode when displaying white, $\Delta \in$ is the dielectric anisotropy of the liquid crystal, d (μm) is the distance between the first alignment layer and the second alignment layer, and L (μm) is an interval between the pixel electrode and the common electrode.

According to the invention, the angle defined by the lengthwise direction of the pixel electrode and the common electrode and the rubbing direction of the alignment layer is set to 1.0 to 20°, the distance d (am) between the first alignment layer and the second alignment layer is set to 2.7 μm or smaller, the dielectric anisotropy Δ∈ of the liquid crystal is set to 8 to 20, the voltage $V_{white}$ to be applied to the pixel electrode when displaying white is set to 4 to 7 V, and the white voltage $V_{white}$ (V), the dielectric anisotropy Δ∈ of the liquid crystal, the distance d (μm) between the first alignment layer and the second alignment layer, and the interval L (μm) between the pixel electrode and the common electrode satisfy the expression 2. The liquid crystal display device therefore has an improved reliability and responds at a high speed of $15 \times 10^{-3}$ sec or less as compared with the conventional IPS liquid crystal display devices.

Another liquid crystal display device according to the invention comprises first and second substrates laid out in such a way as to face each other; an insulating layer provided on that surface of the first substrate which lies on the second substrate side; a pixel electrode and a common electrode one of which is formed on the insulating layer with the other one being formed between the first substrate and the insulating layer and which are in parallel to each other as seen in a planar fashion; a first alignment layer provided so as to cover the insulating layer and the pixel electrode or the common electrode and subjected to an aligning treatment in a direction which forms an angle of 10 to 20° with a lengthwise direction of the pixel electrode and the common electrode; a second alignment layer provided on that surface of the second substrate which lies on the first substrate side and subjected to an aligning treatment in a direction which forms an angle of 10 to 20° with the lengthwise direction of the pixel electrode and the common electrode; and a liquid crystal layer arranged between the first alignment layer and the second alignment layer and comprised of a liquid crystal having a dielectric anisotropy of 8 to 20. A distance between the first alignment layer and the second alignment layer is equal to or less than 2.7 μm, a voltage of 4 to 7 V is applied to the pixel electrode when displaying white, and the following expression 3 is satisfied.

$$11.8 > \frac{V_{white}}{\{(1.0 + T/3.0) \times d^{-0.6} \times L^{0.5} \times \Delta\varepsilon^{-0.5}\}} > 9.8 \quad \text{(Expression 3)}$$

In the expression 3, $V_{white}$ (V) is the voltage to be applied to the pixel electrode when displaying white, Δ∈ is the dielectric anisotropy of the liquid crystal, d (μm) is the distance between the first alignment layer and the second alignment layer, L (μm) is an interval between the pixel electrode and the common electrode, and T (μm) is a thickness of the insulating layer.

According to the invention, the angle defined by the lengthwise direction of the pixel electrode and the common electrode and the rubbing direction of the alignment layer is set to 10 to 20°, the distance d (μm) between the first alignment layer and the second alignment layer is set to 2.7 μm or smaller, the dielectric anisotropy Δ∈ of the liquid crystal is set to 8 to 20, the voltage $V_{white}$ to be applied to the pixel electrode when displaying white is set to 4 to 7 V, and the white voltage $V_{white}$ (V), the dielectric anisotropy Δ∈ of the liquid crystal, the distance d (μm) between the first alignment layer and the second alignment layer, the thickness T (μm) of the interlayer layer, and the interval L (μm) between the pixel electrode and the common electrode satisfy the expression 3. Therefore, even a liquid crystal display device having an insulating layer provided between the pixel electrode and the common electrode can achieve an improved reliability and a fast response speed of $15 \times 10^{-3}$ sec or less as compared with the conventional IPS liquid crystal display devices.

The pixel electrode and the common electrode liquid crystal display device according to the invention may be formed by a transparent conductive layer, and the transparent conductive layer is, for example, an indium-tin oxide (ITO) layer.

A method of manufacturing a liquid crystal display device according to the invention comprises the steps of providing an insulating layer on a first substrate, forming a common electrode and a pixel electrode in parallel to each other on the insulating layer, then forming a first alignment layer, subjected to an aligning treatment in a direction which forms an angle of 10 to 20° with a lengthwise direction of the pixel electrode and the common electrode, in such a way as to cover the insulating layer, the pixel electrode and the common electrode; forming a second alignment layer, subjected to an aligning treatment in a direction which forms an angle of 10 to 20° with the lengthwise direction of the pixel electrode and the common electrode, on the second substrate; and arranging the first substrate and the second substrate to face each other in such a way that a distance between the first alignment layer and the second alignment layer becomes equal to or less than 2.7 μm, and arranging a liquid crystal having a dielectric anisotropy of 8 to 20 between the first alignment layer and the second alignment layer. When a voltage of 4 to 7 V is applied to the pixel electrode at a time of displaying white, the voltage $V_{white}$ (V) to be applied to the pixel electrode when displaying white, the dielectric anisotropy Δ∈ of the liquid crystal, the distance d (μm) between the first alignment layer and the second alignment layer, and an interval L (μm) between the pixel electrode and the common electrode satisfy the expression 2.

Another method of manufacturing a liquid crystal display device according to the invention comprises the steps of providing an insulating layer on a first substrate, forming one of a common electrode and a pixel electrode on the insulating layer and the other one between the first substrate and the insulating layer in such a way as to be in parallel to each other as seen in a planar fashion, then forming a first alignment layer, subjected to an aligning treatment in a direction which forms an angle of 10 to 20° with a lengthwise direction of the pixel electrode and the common electrode, in such a way as to cover the insulating layer and the pixel electrode or the common electrode; forming a second alignment layer, subjected to an aligning treatment in a direction which forms an angle of 10 to 20° with the lengthwise direction of the pixel electrode and the common electrode, on the second substrate; and arranging the first substrate and the second substrate to face each other in such a way that a distance between the first alignment layer and the second alignment layer becomes equal to or less than 2.7 μm, and arranging a liquid crystal having a dielectric anisotropy of 8 to 20 between the first alignment layer and the second alignment layer. When a voltage of 4 to 7 V is applied to the pixel electrode at a time of displaying white, the voltage $V_{white}$ (V) to be applied to the pixel electrode when displaying white, the dielectric anisotropy Δ∈ of the liquid crystal, the distance d (μm) between the first alignment layer and the second alignment layer, and an interval L (μm) between the pixel electrode, the common electrode and a thickness T (μm) of the insulating layer satisfy the expression 3.

According to the invention, the reliability and the response speed can be improved by setting the angle defined by the lengthwise direction of the pixel electrode and the common electrode and the rubbing direction of the alignment layer to 10 to 20°, setting the distance d (μm) between the first alignment layer and the second alignment layer to 2.7 μm or smaller, setting the dielectric anisotropy Δ∈ of the liquid crystal to 8 to 20, and optimizing the relationship among the white voltage $V_{white}$ (V), the dielectric anisotropy Δ∈ of the liquid crystal, the distance d (μm) between the first alignment layer and the second alignment layer, and the interval L (μm) between the pixel electrode and the common electrode. This can provide a liquid crystal display device which has a high reliability and responds at a high speed as compared with the conventional IPS liquid crystal display devices.

DETAILED DESCRIPTION OF THE PREFERRED EMBODIMENTS

Figure 1:
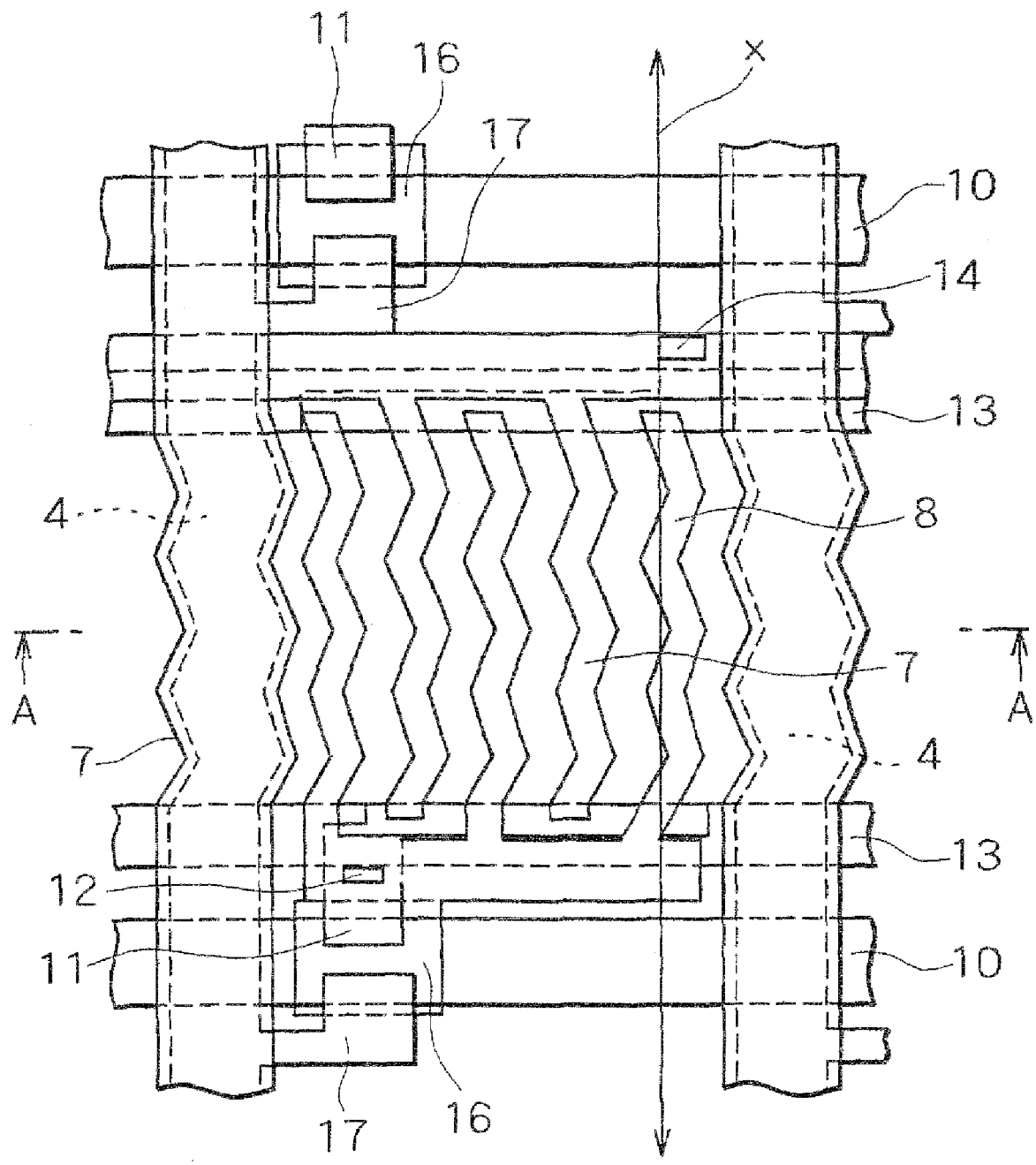
FIG. 1 is a plan view illustrating the structure of a liquid crystal display device according to a first embodiment of the invention.
Figure 2:
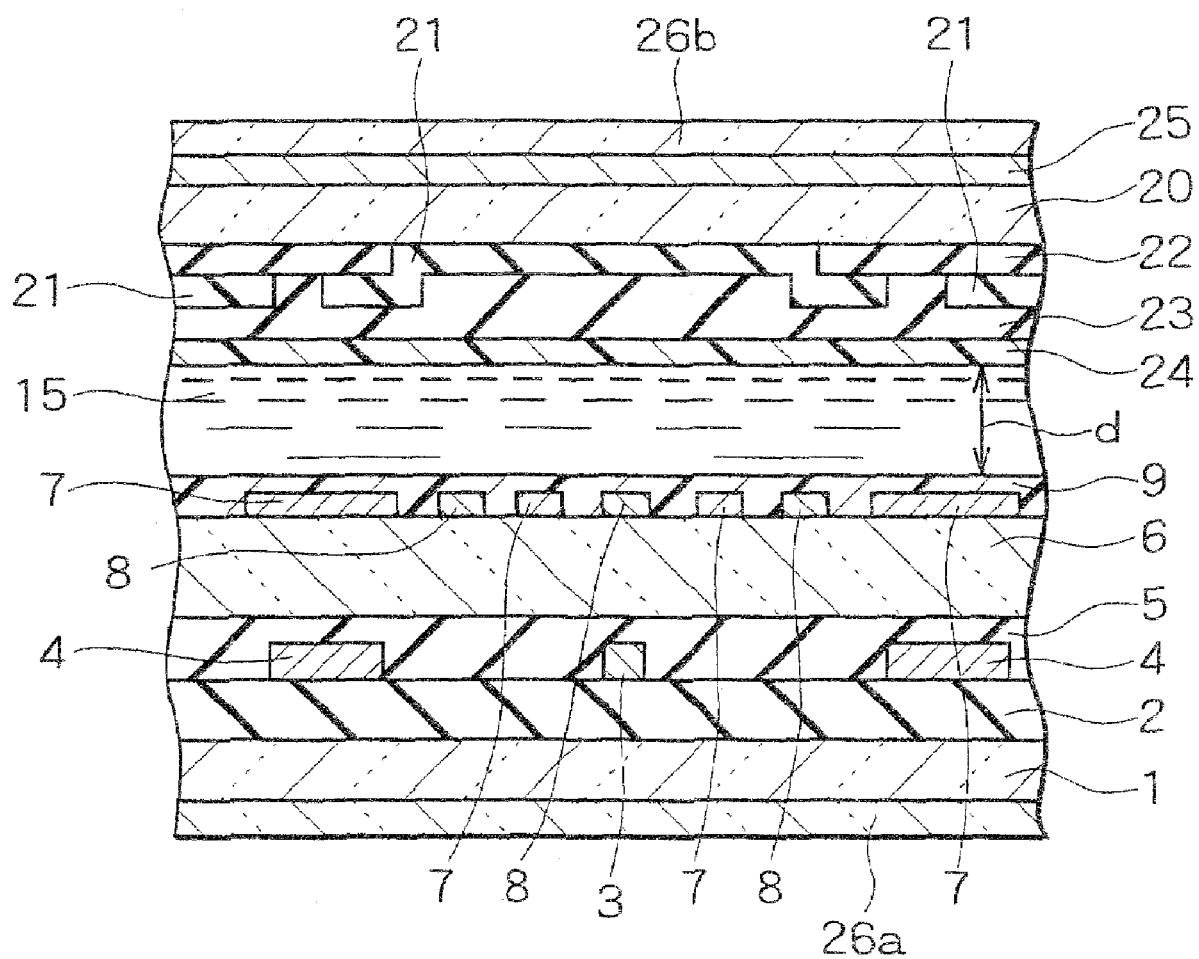
FIG. 2 is a cross-sectional view along line A-A shown in FIG. 1.

Liquid crystal display devices according to preferred embodiments of the invention will be described below with reference to the accompanying drawings. The liquid crystal display device according to the first embodiment will be discussed first. FIG. 1 is a plan view illustrating the structure of the liquid crystal display device according to the embodiment, and FIG. 2 is a cross-sectional view along line A-A shown in FIG. 1. The liquid crystal display device according to the embodiment is an IPS active matrix type liquid crystal display device.

As shown in FIGS. 1 and 2, the liquid crystal display device according to the embodiment has an interlayer insulating layer 2 provided on a transparent substrate 1 and an auxiliary pixel electrode 3 and a data line 4 formed in parallel to each other on the interlayer insulating layer 2. A silicon nitride layer 5 and a transparent acrylic layer 6 as interlayer insulating layers are provided on the interlayer insulating layer 2, the auxiliary pixel electrode 3 and the data line 4 in that order. A common electrode 7 and a pixel electrode 8, both formed by a transparent conductive layer of ITO or so, are formed in parallel to each other on the transparent acrylic layer 6. The common electrode 7 is formed in that area on the transparent acrylic layer 6 that corresponds to an area where the data line 4 is formed, and the pixel electrode 8 is formed in that area on the transparent acrylic layer 6 that corresponds to an area where the auxiliary pixel electrode 3 is formed. An alignment layer 9 that has undergone an aligning treatment in a given direction is provided on the transparent acrylic layer 6 in such a way as to cover the common electrode 7 and the pixel electrode 8.

A gate electrode 10 extending in a direction orthogonal to the data line 4 is formed between the transparent substrate 1 and the interlayer insulating layer 2. Formed in the vicinity of the position on the interlayer insulating layer 2 where the data line 4 and the gate electrode 10 cross is a thin film transistor having an amorphous silicon layer 16, a source electrode 11 and a drain electrode 17. The source electrode 11 of the thin film transistor is connected to the auxiliary pixel electrode 3 and is also connected to the pixel electrode 8 via a contact hole 12 provided in the silicon nitride layer 5 and the transparent acrylic layer 6 on the source electrode 11. Further, a common electrode wiring 13 is formed in parallel to the gate electrode 10 between the transparent substrate 1 and the interlayer insulating layer 2. The common electrode wiring 13 is connected to the common electrode 7 via a contact hole 14 that is provided in such a way as to penetrate through the interlayer insulating layer 2, the silicon nitride layer 5 and the transparent acrylic layer 6.

A color layer 21 and a black matrix 22 are formed on a transparent substrate 20 that is so arranged as to face the transparent substrate 1. Provided on the transparent substrate 20, the color layer 21 and the black matrix 22 is an overcoat layer 23 on which a columnar spacer (not shown) for forming a cell gap is provided. The columnar spacer is provided in that area of the transparent substrate 20, which aligns to an area of the transparent substrate 1 where the gate electrode 10 is formed and the data line 4 and the amorphous silicon layer 16 are not formed. An alignment layer 24 that has undergone an aligning treatment in a given direction is provided on the overcoat layer 23 and the spacer. A conductive layer 25 for charge prevention is provided on that side of the transparent substrate 20 that is opposite to the side where the color layer 21 and the black matrix 22 are formed.

The top surfaces of the alignment layer 9 and the alignment layer 24 in the embodiment are subjected to an aligning treatment in a direction perpendicular to the extending direction of the gate electrode 10 by rubbing. The common electrode 7 and the pixel electrode 8 are in parallel to each other and are bent in such a way as to be symmetrical in the alignment direction of the alignment layer 24, or a rubbing direction x. An angle β defined by the rubbing direction x and the lengthwise direction of the common electrode 7 and the pixel electrode 8 is in a range of 10 to 20°.

The transparent substrate 1 and the transparent substrate 20 are arranged in such a way that their rubbing directions x become identical with the alignment layer 9 and the alignment layer 24 located inward. A liquid crystal having a dielectric anisotropy Δ∈ of 8 to 20 is sealed between the alignment layer 9 and the alignment layer 24 by a seal member (not shown) or so. The thickness of a liquid crystal layer 15 in the liquid crystal display device according to the embodiment, or a cell gap d between the alignment layer 9 and the alignment layer 24 is 2.7 μm or less. The value of the cell gap d can be adjusted by changing the height of the columnar spacer.

Sheet polarizers 26a and 26b are adhered to the outer surfaces of the transparent substrate 1 and the transparent substrate 20, respectively. The sheet polarizer 26a provided on the transparent substrate 1 is adhered in such a way that its polarization transmission axis and the rubbing direction x of the alignment layer 9 formed on the transparent substrate 1 become approximately parallel to each other. The sheet polarizer 26b provided on the transparent substrate 20 is adhered in such a way that its polarization transmission axis and the rubbing direction x of the alignment layer 24 formed on the transparent substrate 20 become approximately perpendicular to each other.

A description will now be given of the reason for restricting the values of the cell gap d and the dielectric anisotropy $\Delta\epsilon$ of the liquid crystal of the liquid crystal display device according to the embodiment.

The present inventors conducted experiments and researches to clearly reproduce video images on liquid crystal display devices with high fidelity and discovered that the video performance would be improved significantly by setting a response speed $\tau(=\tau_{on}+\tau_{off})$, which is the sum of a response time $\tau_{on}$ for the liquid crystal to switch from black display to white display and a response time $\tau_{off}$ for the liquid crystal to switch from white display to black display, to $15\times10^{-3}$ sec or less. As apparent from the expression 1, it is effective to make the cell gap d and the dielectric anisotropy $\Delta\epsilon$ smaller in order to make the response of the IPS active matrix type liquid crystal display device faster, or reduce the response speed $\tau$. The present inventors therefore studied the relationship between the cell gap d and the response speed $\tau$. Table 1 below shows the results of acquiring the response speed $\tau$ through actual measurements and experiments while changing the cell gap d by using a liquid crystal with the smallest rotational viscosity coefficient $\gamma_1$ (-90 mPa·sec) in those liquid crystals which are available, at present, for use in an IPS liquid crystal display device. The present inventors empirically found out that, as shown in Table 1, setting the cell gap d to 2.7 μm or less could make the response speed $\tau$ to $15\times10^{-3}$ sec or less. Therefore, the cell gap d of the liquid crystal display device according to the embodiment is decided to be 2.7 μm or less.

TABLE 1

| cell gap d (μm) | rotational viscosity coefficient of liquid crystal $\gamma_1$ (mPa · sec) | response speed $\tau$ ($\times 10^3$ sec) |
|---|---|---|
| 2.4 | 90 | 12 |
| 2.7 | 90 | 15 |
| 2.8 | 90 | 16 |

The IPS active matrix type liquid crystal display device suffers a problem that reducing the cell gap d raises the drive voltage. The relationship among a threshold voltage $V_{th}$ (V), the dielectric anisotropy $\Delta\epsilon$ of the liquid crystal, the cell gap d (μm) and the interval L (μm) between the common electrode 7 and the pixel electrode 8 of the liquid crystal display device is given by the following expression 4.

$$V_{th} \propto \frac{L}{d} \times \left(\frac{K_{22}}{\Delta\epsilon}\right)^{0.5} \quad \text{(Expression 4)}$$

In the expression 4, $K_{22}$ is the elastic coefficient of the liquid crystal. As the VT peak voltage $V_{max}$ of the liquid crystal display device is proportional to the threshold voltage $V_{th}$ given in the expression 4, the following expression 5 is derived from the expression 4.

$$V_{max} \propto \frac{L}{d} \times \left(\frac{K_{22}}{\Delta\epsilon}\right)^{0.5} \quad \text{(Expression 5)}$$

As apparent from the expression 5, narrowing the cell gap d increases the VT peak voltage $V_{max}$, so that the liquid crystal display device may not be able to operate on the proper voltage. One way to reduce the drive voltage is to increase the dielectric anisotropy $\Delta\epsilon$. However, increasing the dielectric anisotropy $\Delta\epsilon$ increases the rotational viscosity coefficient $\gamma_1$, thus making the response speed $\tau$ slower.

In general, an IPS liquid crystal display device having a narrow cell gap d uses a liquid crystal material whose refractive index anisotropy $\Delta n$ is greater than 0.1. With such a material, however, the rotational viscosity coefficient $\gamma_1$ does not become smaller even if the dielectric anisotropy $\Delta\epsilon$ is made smaller than 8, and no significant improvement on the reliability is not seen. Making the dielectric anisotropy $\Delta\epsilon$ of the liquid crystal greater than 20 not only increase the rotational viscosity coefficient $\gamma_1$ but also results in very unstable reliability so that the liquid crystal display device cannot be used properly. In this respect, the dielectric anisotropy $\Delta\epsilon$ of the liquid crystal of the liquid crystal display device according to the embodiment is set to 8 to 20.

The operation of the liquid crystal display device according to the embodiment will be discussed next. The liquid crystal display device according to the embodiment displays images in normally black mode in which light does not transmit when no electric field is applied. That is, black is displayed with a voltage of around 0 V, the liquid crystal is driven by an electric field generated between the common electrode 7 and the pixel electrode 8 when a voltage is applied to the pixel electrode 8, and the birefringence of the liquid crystal changes light transmittance.

In the liquid crystal display device according to the embodiment, the voltage (white voltage) $V_{white}$ to be applied to the pixel electrode 8 when displaying white is set to 4 to 7 V, and further, the white voltage $V_{white}$ (V), the dielectric anisotropy $\Delta\epsilon$ of the liquid crystal, the cell gap d (μm), the interval L (μm) between the common electrode 7 and pixel electrode 8, and the thickness T (μm) of the interlayer layer are set within the range given by the following expression 6.

$$11.8 > \frac{V_{white}}{d^{-0.6} \times L^{0.5} \times \Delta\epsilon^{-0.5}} > 9.8 \quad \text{(Expression 6)}$$

The reason for the settings will be described below. The present inventors made studies on IPS liquid crystal display devices that would provide good display with high transmittance and keep the proper drive voltage, even if the cell gap d sets 2.7 μm or less to make the response speed $\tau$ to $15\times10^{-3}$ sec or less, and acquired the following results.

Figure 3:
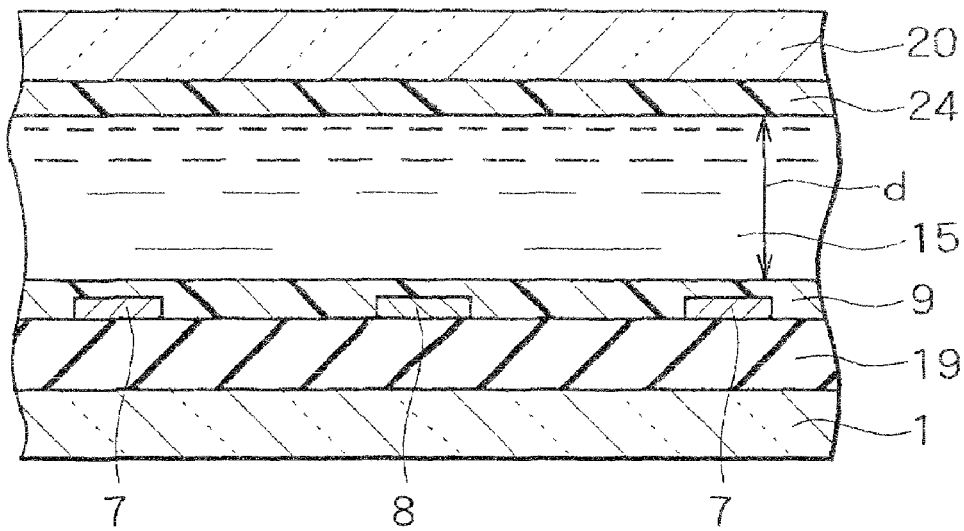
FIG. 3 is a cross-sectional view exemplarily showing positions of a common electrode 7 and a pixel electrode 8 in the first embodiment of the invention.

First, when the cell gap is narrowed and the liquid crystal is driven by an in-plane electric field, an intense field is demanded so that it is desirable that the common electrode 7 and the pixel electrode 8 which generate the in-plane electric field should be positioned as close to the liquid crystal layer 15 as possible. FIG. 3 is a cross-sectional view exemplarily showing positions of the common electrode 7 and the pixel electrode 8 in the liquid crystal display device according to the embodiment. The present inventors found out that if both the common electrode 7 and the pixel electrode 8 were formed closer to the transparent substrate 1 than an insulating layer 19, an extremely high voltage would be needed to drive the liquid crystal with a narrow cell gap, so that the structure would not be appropriate for driving the liquid crystal. The present inventors eventually found out that the most preferable structure was to arrange at least one of the common electrode 7 and the pixel electrode 8 in such a way as to be in contact with the alignment layer 9 or, on the insulating layer 19.

The present inventors also studied the relationships between the VT peak voltage $V_{max}$ (V) and the dielectric anisotropy $\Delta\in$ of the liquid crystal, the cell gap d (μm) and the interval L (μm) between the common electrode 7 and the pixel electrode 8 in the liquid crystal display device shown in FIG. 3 for a narrow gap of 2.7 μm or less, and found out that as the cell gap was made narrower, the expression 5 was estranged from the actual measurements. Accordingly, the present inventors made detailed studies on those relationships through methods discussed below.

The present inventors found out that the best relationship between the drive voltage and the response speed was acquired when the angle β defined by the lengthwise direction of the electrodes and the initial alignment direction of the liquid crystal in the liquid crystal layer 15 was 15°, so that the angle β was set to 15°. Because no significant differences in the drive voltage and the response speed are noticeable when the angle β lies within the range of 10 to 20°, the following study results are applicable to any angle β which lies within the range of 10 to 20°.

Figure 4:
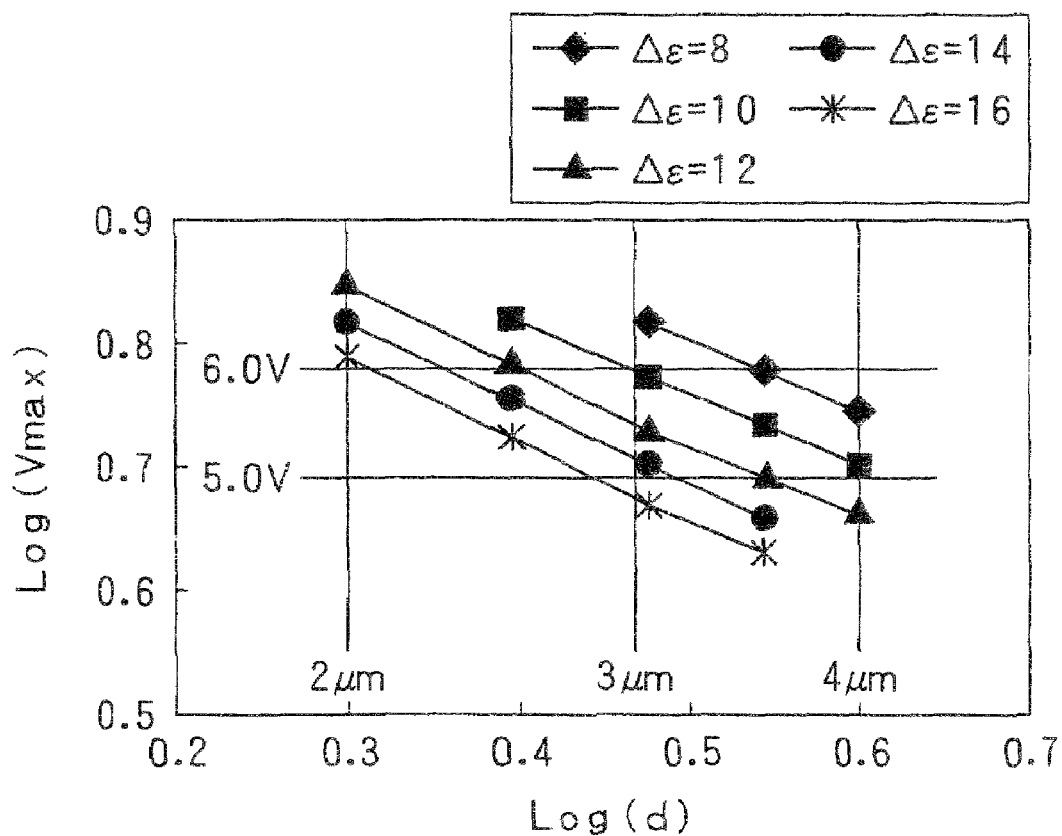
FIG. 4 is a graph showing the relationship between a VT peak voltage $V_{max}$ and a cell gap d whose log is taken on the horizontal axis while the log of the VT peak voltage $V_{max}$ is taken on the vertical axis.

FIG. 4 is a graph showing the relationship between the VT peak voltage $V_{max}$ and the cell gap d whose log is taken on the horizontal axis while the log of the VT peak voltage $V_{max}$ is taken on the vertical axis. Having conducted simulation with the interval L (μm) between the electrodes being set to 10 μm, as apparent from FIG. 4, the present inventors empirically found out that the inclination of the graph having Log ($V_{max}$) plotted with respect to Log (d) was −0.6 and the VT peak voltage $V_{max}$ was proportional to the cell gap d to the power of −0.6.

Figure 5:
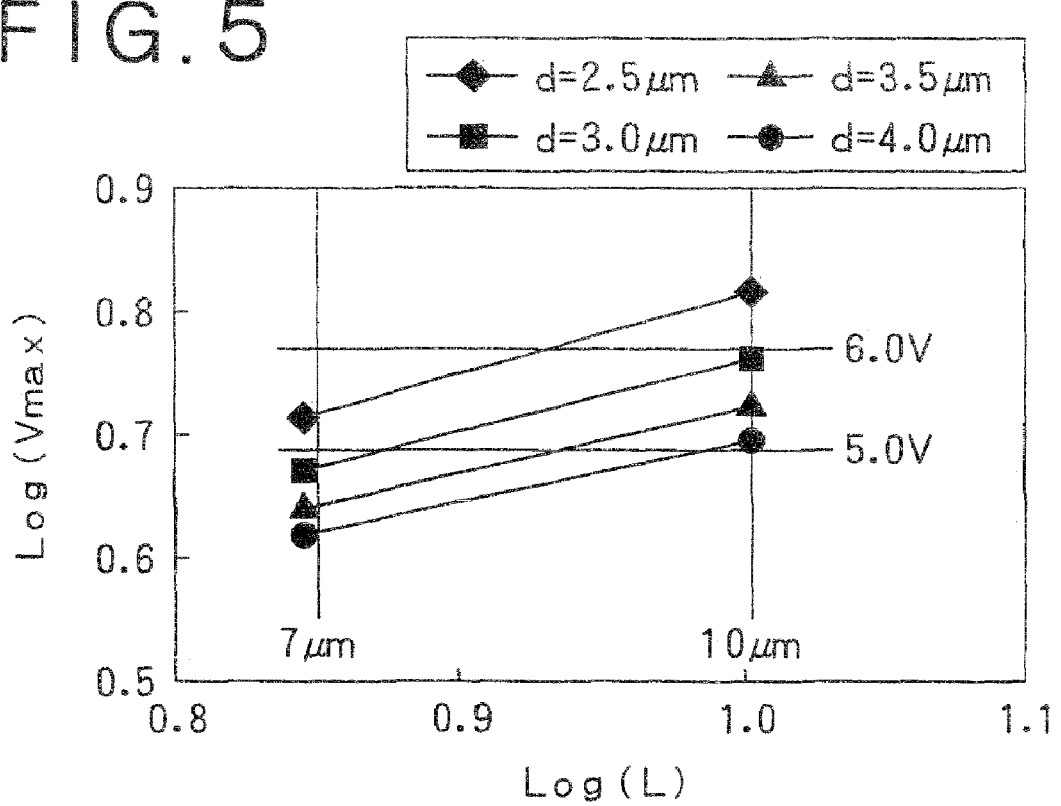
FIG. 5 is a graph showing the relationship between a VT peak voltage $V_{max}$ and the interval L between electrodes whose log is taken on the horizontal axis while the log of the VT peak voltage $V_{max}$ is taken on the vertical axis.

FIG. 5 is a graph showing the relationship between the VT peak voltage $V_{max}$ and the interval L between the electrodes whose log is taken on the horizontal axis while the log of the VT peak voltage $V_{max}$ is taken on the vertical axis. Having conducted simulation with the dielectric anisotropy $\Delta\in$ of the liquid crystal being set to 10, as apparent from FIG. 5, the present inventors empirically found out that the inclination of the graph having Log ($V_{max}$) plotted with respect to Log (L) was 0.5 and the VT peak voltage $V_{max}$ was proportional to the interval L (μm) between the electrodes to the power of 0.5.

Figure 6:
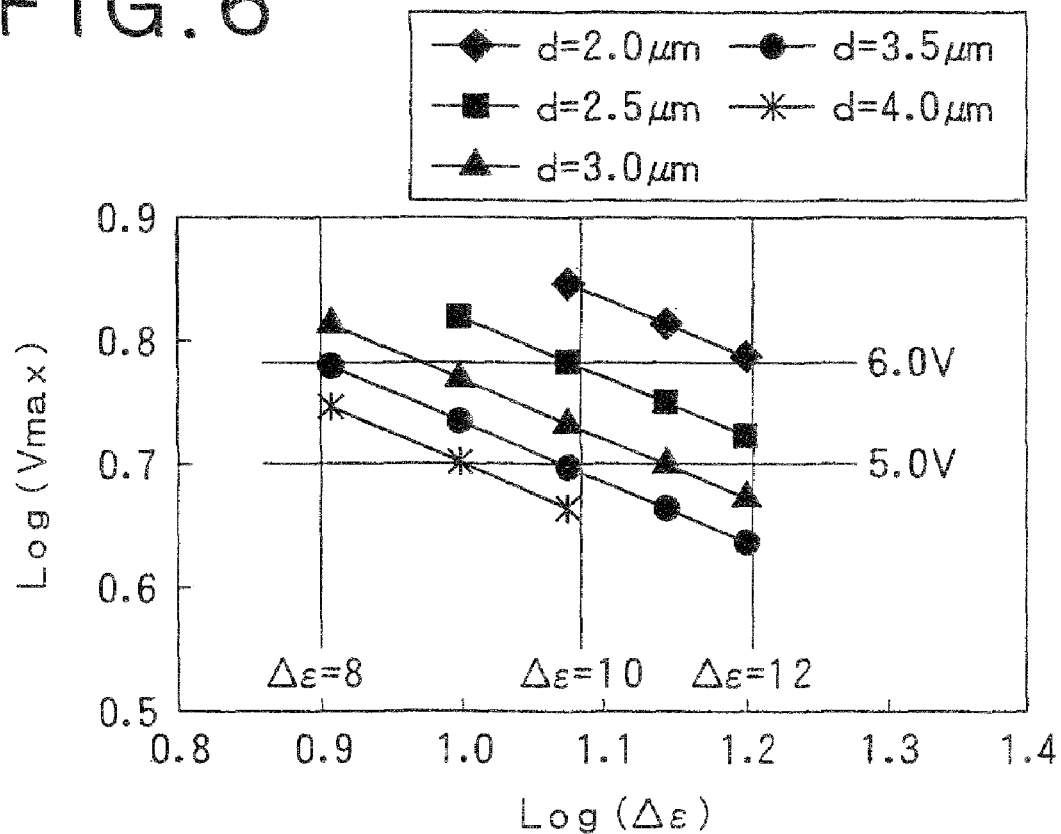
FIG. 6 is a graph showing the relationship between a VT peak voltage $V_{max}$ and the dielectric anisotropy Δ∈ of the liquid crystal whose log is taken on the horizontal axis while the log of the VT peak voltage $V_{max}$ is taken on the vertical axis.

FIG. 6 is a graph showing the relationship between the VT peak voltage $V_{max}$ and the dielectric anisotropy $\Delta\in$ of the liquid crystal whose log is taken on the horizontal axis while the log of the VT peak voltage $V_{max}$ is taken on the vertical axis. Having conducted simulation with the interval L (μm) between the electrodes being set to 10 μm, as apparent from FIG. 6, the present inventors empirically found out that the inclination of the graph having Log ($V_{max}$) plotted with respect to log ($\Delta\in$) was −0.5 and the VT peak voltage $V_{max}$ was proportional to the dielectric anisotropy $\Delta\in$ of the liquid crystal to the power of −0.5.

Through the results, the present inventors found out that in an area with a small cell gap d, particularly, in an area whose cell gap d is 2.7 μm or less, the relationship among the VT peak voltage $V_{max}$, the dielectric anisotropy $\Delta\in$ of the liquid crystal, the intersubstrate gap d (μm) and the interval L (μm) between the pixel electrode and the common electrode would satisfy the following expression 7.

$$V_{max} \propto d^{-0.6} \times L^{0.5} \times \Delta\in^{-0.5}$$ (Expression 7)

Setting the coefficient of proportionality in the expression 7 to A derives the following expression 8.

$$V_{max} = A \times d^{-0.6} \times L^{0.5} \times \Delta\in^{-0.5}$$ (Expression 8)

The proportionality coefficient A in the expression 8 depends on the elastic coefficient of the liquid crystal to be used. It is known that the elastic coefficient generally differs considerably with the nematic-isotropic transition point $T_{ni}$ of the liquid crystal. The elastic coefficient also differs with the polar group of the liquid crystal component. For example, the elastic coefficient differs between a cyano-based liquid crystal containing a cyano group and a fluorine-based liquid crystal containing only fluorine. It is mainly in the usages as TVs and monitors that very fast display of the liquid crystal is demanded, and in consideration of the normal use environments in those usages, it is preferable that the nematic-isotropic transition point $T_{ni}$ of the liquid crystal should be set to 65 to 80° C. In general, the fluorine-based liquid crystal is superior to the cyano-based liquid crystal in reliability, so that the use of the fluorine-based liquid crystal can provide a liquid crystal display with an excellent reliability.

Table 2 below shows the values of A obtained through actual measurements and simulation when liquid crystal materials satisfying the above conditions were used.

TABLE 2

| cell gap d (μm) | interval between pixel electrode and common electrode L (μm) | dielectric anisotropy of liquid crystal $\Delta\epsilon$ | VI peak voltage $V_{max}$ (V) | proportionality constant A |
|---|---|---|---|---|
| 4.0 | 10.0 | 8.0 | 5.5 | 11.30 |
| 3.5 | 10.0 | 8.0 | 6.2 | 11.76 |
| 3.0 | 10.0 | 9.0 | 6.0 | 11.00 |
| 3.0 | 7.0 | 9.0 | 5.1 | 11.18 |
| 2.4 | 7.0 | 10.0 | 5.4 | 10.97 |
| 2.4 | 7.0 | 11.2 | 5.2 | 11.12 |
| 2.4 | 7.0 | 13.6 | 4.9 | 11.55 |

The present inventors also conducted detailed examinations on many examples and found out that the proportionality coefficient A in the expression 8 exceeded 10.9 and less than 11.8. In the IPS liquid crystal display device, the transmittance can be improved by setting the voltage to be applied to the pixel electrode 8 when displaying white (white voltage $V_{white}$) to around the VT peak voltage $V_{max}$. Specifically, a high transmittance can be acquired by setting the white voltage $V_{white}$ in a range of 90 to 100% with respect to the VT peak voltage $V_{max}$ as apparent from the following expression 9.

$$0.9 \times V_{max} < V_{white} < V_{max}$$

An expression 10 below is derived from the expression 8 and the expression 9.

$$0.9 \times A > \frac{V_{white}}{d^{-0.6} \times L^{0.5} \times \Delta\varepsilon^{-0.5}} > A$$ (Expression 10)

As the proportionality coefficient A is greater than 10.9 and less than 11.8 as mentioned above, the expression 6 can be derived from the expression 10.

When both of the common electrode 7 and the pixel electrode 8 are formed on the insulating layer 19 in such a way as to be in contact with the alignment layer 9 as shown in FIG. 3, setting the individual parameters so as to satisfy the expression 6 can provide an IPS liquid crystal display device which has a high transmittance and operates fast while keeping the adequate drive voltage even with the cell gap d set to 2.7 μm or less.

When a drive circuit available at present is used, the proper white voltage $V_{white}$ should be greater than 4 V and lower than 7 V. The simulation conducted by the present inventors demonstrates a very good match with the actual measurements, so that physically adequate results can be predicted.

Figure 7:
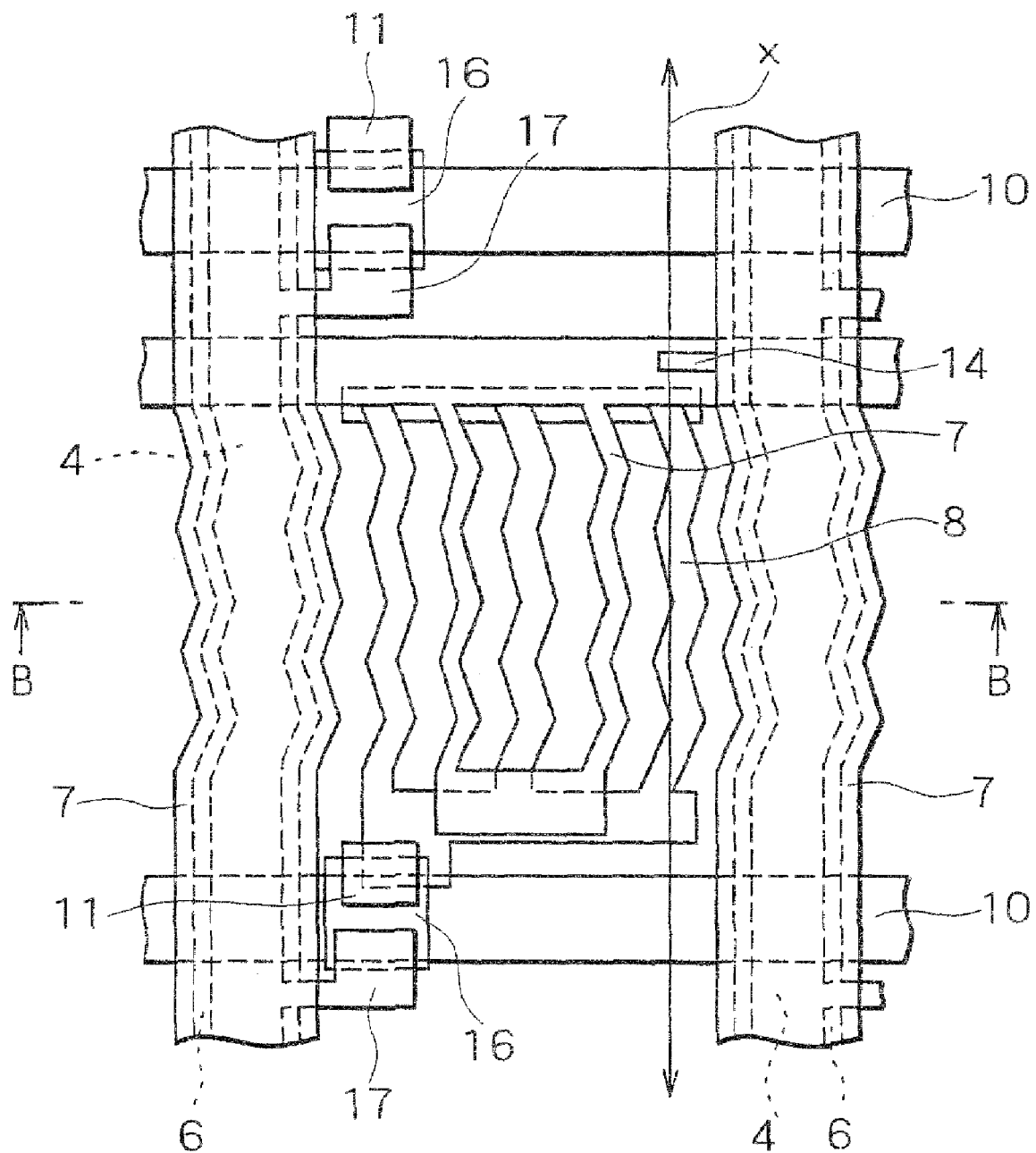
FIG. 7 is a plan view illustrating the structure of a liquid crystal display device according to a second embodiment of the invention.
Figure 8:
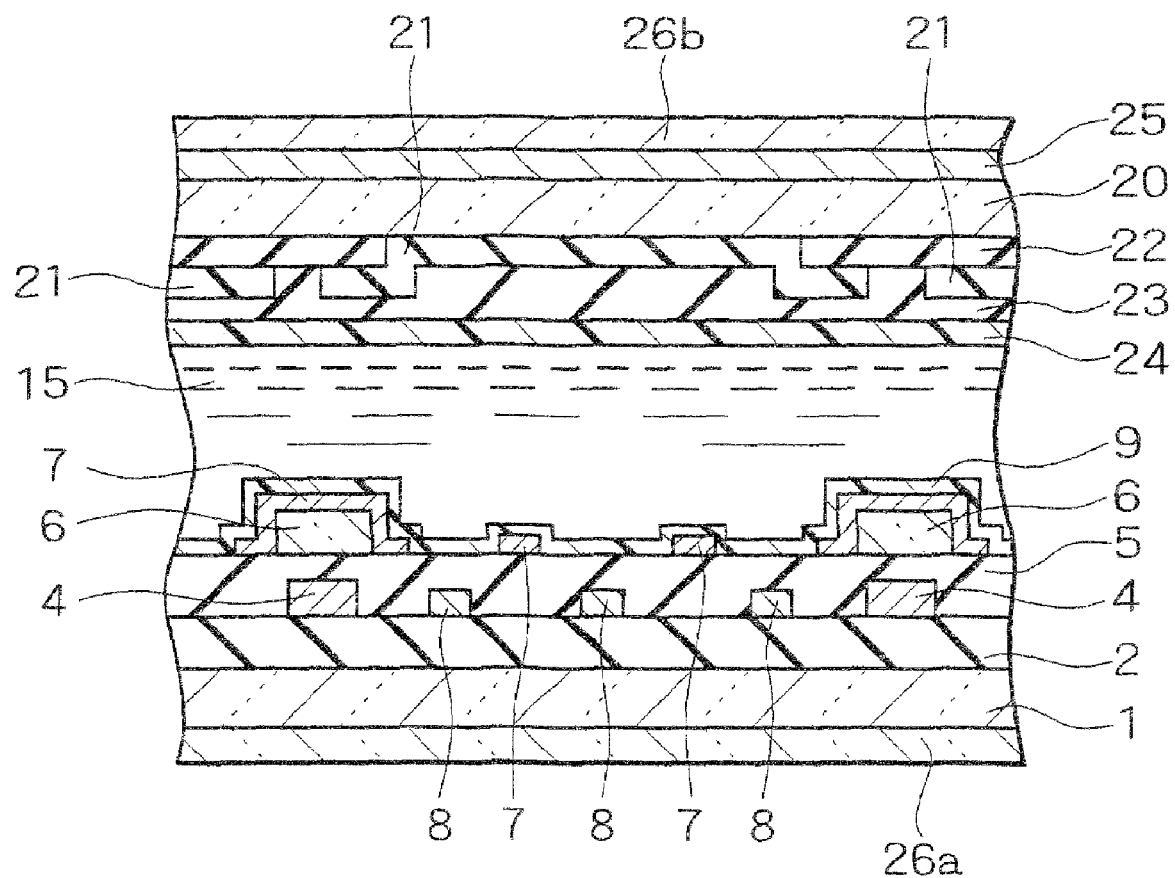
FIG. 8 is a cross-sectional view along line B-B shown in FIG. 7.

Although the foregoing description of the first embodiment has been given of the case where the common electrode and the pixel electrode are in contact with the alignment layer, the invention is not limited to this case but either one of the common electrode and the pixel electrode has only to be formed on an insulating layer in such a way as to be in contact with the alignment layer. A description will now be given of a liquid crystal display device according to the second embodiment of the invention which has the common electrode formed on an insulating layer in such a way as to be in contact with the alignment layer and has the pixel electrode formed between an insulating layer having a thickness T μm and the transparent substrate. FIG. 7 is a plan view illustrating the structure of the liquid crystal display device according to the second embodiment of the invention, and FIG. 8 is a cross-sectional view along line B-B shown in FIG. 7. The liquid crystal display device according to the embodiment is an IPS active matrix type liquid crystal display device.

As shown in FIGS. 7 and 8, the liquid crystal display device according to the embodiment has an interlayer insulating layer 2 provided on a transparent substrate 1 and a pixel electrode 8 and a data line 4 formed in parallel to each other on the interlayer insulating layer 2. A silicon nitride layer 5 as an interlayer insulating layer is provided on the interlayer insulating layer 2, the pixel electrode 8 and the data line 4. A acrylic resin layer 6 is formed in that area on the silicon nitride layer 5 which corresponds to an area where the data line 4 is formed. A common electrode 7 of ITO is formed in that area on the acrylic resin layer 6 and the silicon nitride layer 5 which corresponds to an area where the data line 4 is formed, i.e., that area on the acrylic resin layer 6 where the pixel electrode 8 is not formed, in such a way that the common electrode 7 and the pixel electrode 8 become in parallel to each other. Further, an alignment layer 9 is provided on those electrodes and layers.

A gate electrode 10 extending in a direction orthogonal to the data line 4 is formed between the transparent substrate 1 and the interlayer insulating layer 2. Formed in the vicinity of the position on the interlayer insulating layer 2 where the data line 4 and the gate electrode 10 cross is a thin film transistor having an amorphous silicon layer 16, a source electrode 11 and a drain electrode 17. The source electrode 11 of the thin film transistor is connected to the pixel electrode 8. Further, a common electrode wiring 13 is formed in parallel to the gate electrode 10 between the transparent substrate 1 and the interlayer insulating layer 2. The common electrode wiring 13 is connected to the common electrode 7 via a contact hole 14 that is provided in such a way as to penetrate through the interlayer insulating layer 2, the silicon nitride layer 5 and the transparent acrylic layer 6.

A color layer 21 and a black matrix 22 are formed on a transparent substrate 20 that is so arranged as to face the transparent substrate 1. Provided on the transparent substrate 20, the color layer 21 and the black matrix 22 is an overcoat layer 23 on which a columnar spacer (not shown) for forming a cell gap is provided. The columnar spacer is provided in that area of the transparent substrate 20, which aligns to an area of the transparent substrate 1 where the gate electrode 10 is formed and the data line 4 and the amorphous silicon layer 16 are not formed. An alignment layer 24 which has undergone an aligning treatment in a given direction is provided on the on the overcoat layer 23 and the spacer. A conductive layer 25 for charge prevention is provided on that side of the transparent substrate 20 that is opposite to the side where the color layer 21 and the black matrix 22 are formed.

The top surfaces of the alignment layer 9 and the alignment layer 24 in the embodiment are subjected to an aligning treatment in a direction perpendicular to the extending direction of the gate electrode 10 by rubbing. The common electrode 7 and the pixel electrode 8 are in parallel to each other and are bent in such a way as to be symmetrical in the alignment direction of the alignment layer 24, or a rubbing direction x. An angle β defined by the rubbing direction x and the lengthwise direction of the common electrode 7 and the pixel electrode 8 is in a range of 10 to 20°.

The transparent substrate 1 and the transparent substrate 20 are arranged in such a way that their rubbing directions x become identical with the alignment layer 9 and the alignment layer 24 located inward. A liquid crystal having a dielectric anisotropy Δ∈ of 8 to 20 is sealed between the alignment layer 9 and the alignment layer 24 by a seal member (not shown) or so. The thickness of a liquid crystal layer 15 in the liquid crystal display device according to the embodiment, or a cell gap d between the alignment layer 9 and the alignment layer 24 is 2.7 μm or less. The value of the cell gap d of the liquid crystal display device according to the embodiment can be adjusted by changing the height of the columnar spacer.

Sheet polarizers 26a and 26b are adhered to the outer surfaces of the transparent substrate 1 and the transparent substrate 20, respectively. The sheet polarizer 26a provided on the transparent substrate 1 is adhered in such a way that its polarization transmission axis and the rubbing direction x of the alignment layer 9 formed on the transparent substrate 1 become approximately parallel to each other. The sheet polarizer 26b provided on the transparent substrate 20 is adhered in such a way that its polarization transmission axis and the rubbing direction x of the alignment layer 24 formed on the transparent substrate 20 become approximately perpendicular to each other.

The operation of the liquid crystal display device according to the embodiment will be discussed next. The liquid crystal display device according to the embodiment displays images in normally black mode in which light does not transmit when no electric field is applied. That is, black is displayed with a voltage of around 0 V, the liquid crystal is driven by an electric field generated between the common electrode 7 and the pixel electrode 8 when a voltage is applied to the pixel electrode 8, and the birefringence of the liquid crystal changes light transmittance.

Figure 9:
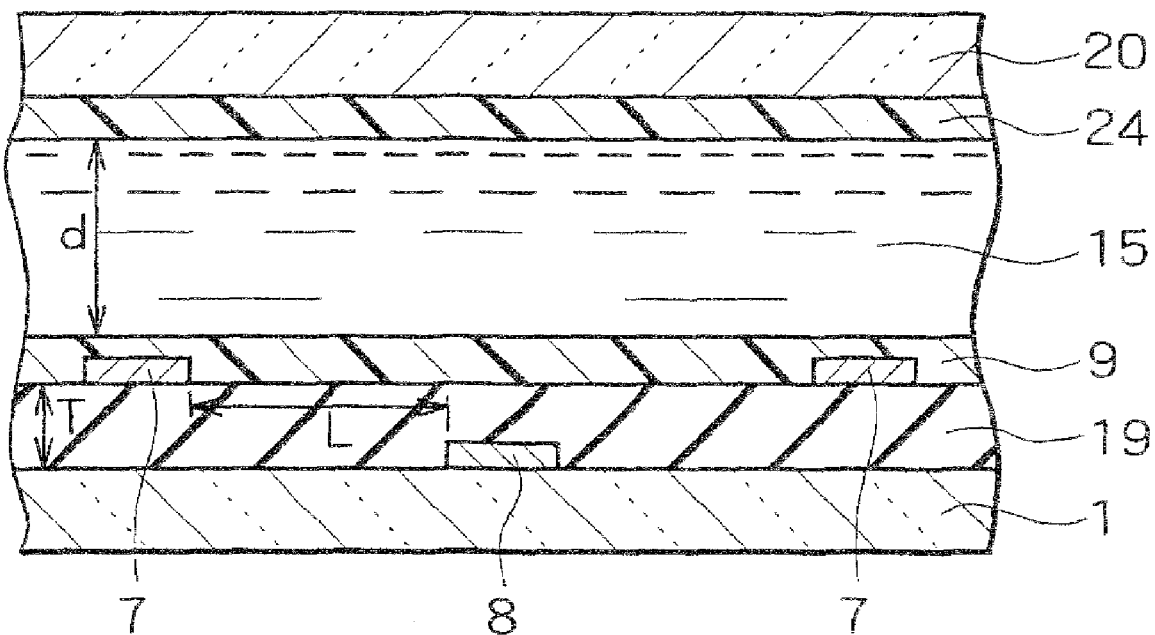
FIG. 9 is a cross-sectional view exemplarily showing positions of the common electrode 7 and the pixel electrode 8 in the second embodiment of the invention.

FIG. 9 is a cross-sectional view exemplarily showing positions of the common electrode 7 and the pixel electrode 8 in the second embodiment of the invention. In liquid crystal display device according to the embodiment, as shown in FIG. 9, the common electrode 7 is formed in such a way as to be in contact with the alignment layer 9, or formed on the insulating layer 19, the pixel electrode 8 is formed between the insulating layer 19 and the transparent substrate 1, and the thickness of the insulating layer 19 present between the common electrode 7 and the pixel electrode 8 is T μm. In this case, as apparent from the following expression 11, the VT peak voltage $V_{max}$ becomes greater as compared with the case where both the common electrode 7 and the pixel electrode 8 are in contact with the alignment layer 9.

$$V_{max} = A \times d^{-0.6} \times L^{0.5} \times \Delta\epsilon^{-0.5} \times (1.0 + T/3.0)$$

In the liquid crystal display device according to the embodiment, therefore, the voltage (white voltage) $V_{white}$ to be applied to the pixel electrode 8 when displaying white is set to 4 to 7 V, and further, the white voltage $V_{white}$ (V), the dielectric anisotropy $\Delta\epsilon$ of the liquid crystal, the cell gap d (μm), the interval L (μm) between the common electrode 7 and pixel electrode 8, and the thickness T (μm) of the interlayer layer are so set as to satisfy by the following expression 12. This makes it possible to provide an IPS liquid crystal display device which has a high transmittance and operates fast at a high response speed τ of $15 \times 10^{-3}$ sec or less while keeping the adequate drive voltage even with the cell gap d set to 2.7 μm or less.

$$11.8 > \frac{V_{white}}{\left\{\frac{(1.0 + T/3.0) \times d^{-0.6} \times}{L^{0.5} \times \Delta\epsilon^{-0.5}}\right\}} > 9.8 \quad \text{(Expression 12)}$$

The advantages of the examples of the invention will be discussed below in comparison with comparative examples that are out of the scope of the invention. First, a liquid crystal display device with the structure shown in FIGS. 1 and 2 was prepared as the first example of the invention. A liquid crystal material with a dielectric anisotropy $\Delta\epsilon$ of 11.2, a nematic-isotropic transition point $T_{ni}$ of 75° C., and a refractive index anisotropy $\Delta n$ of 0.120 was used for the liquid crystal. The angle β defined by the lengthwise direction of the pixel electrode and the common electrode and the initial alignment direction of the liquid crystal in the liquid crystal layer 15 was set to 15°, and the cell gap d was set to 2.4 μm. In case where the white voltage $V_{white}$ is set to 5.0 V, the interval L between the electrodes which is acquired from the expression 10 lies in a range of exceeding 5.7 μm and less than 8.3 μm. In this example, therefore, the pixel size was set to 79.5 μm lateral and 238.5 μm longitudinal, the widths of the pixel electrode and the common electrode was set to 3.5 μm, and the interval L between the electrodes was set to 7 μm so that the electrodes could be laid out most efficiently under the conditions of the parameters. The characteristics of the liquid crystal display device, when operated with the white voltage $V_{white}$ set to 5.0 V, were examined. The results are shown in Table 3 below.

TABLE 3

| liquid crystal | nematic-isotropic transition point ($T_{ni}$) | 75° C. |
|---|---|---|
| | refractive index anisotropy (Δn) | 0.120 |
| | dielectric anisotropy (Δε) | 11.2 |
| | rotational viscosity coefficient ($\gamma_1$) | 90 mPa·sec |
| cell gap (d) | | 2.4 μm |
| interval between pixel electrode and common electrode (L) | | 7.0 μm |
| angle defined by the lengthwise direction of electrodes and the alignment direction of liquid crystal (β) | | 15° |
| VI peak voltage ($V_{max}$) | | 5.2 V |
| white voltage ($V_{white}$) | | 5.0 V |
| response speed (τ) | | $11.9 \times 10^{-3}$ sec |
| response time to switch from black display to white display ($\tau_{on}$) | | $5.7 \times 10^{-3}$ sec |
| response time to switch from white display to black display ($\tau_{off}$) | | $6.2 \times 10^{-3}$ sec |

In the liquid crystal display device according to the example, the transmittance increased as the voltage increased, and the transmittance became the maximum when the applied voltage was 5.2 V. The proportionality coefficient A then was 11.12. Therefore, the white voltage $V_{white}$ in the example is equivalent to 96% of the voltage that maximizes the transmittance or the VT peak voltage $V_{max}$. Accordingly, the transmittance of the liquid crystal display device according to the example showed a high value of 99.2% of the maximum transmittance. Further, as shown in Table 3, the response time $\tau_{on}$ for the liquid crystal to switch from black display to white display was $5.7 \times 10^{-3}$ sec and the response time $\tau_{off}$ for the liquid crystal to switch from white display to black display was $6.2 \times 10^{-3}$ sec in the liquid crystal display device according to the example. Therefore, the response speed τ or the sum of those two response times became $11.9 \times 10^{-3}$ sec. significantly smaller than $15 \times 10^{-3}$ sec at which good video images could be obtained, achieving an extremely good video display performance.

Next, a liquid crystal display device with the structure shown in FIGS. 7 and 8 was prepared as the second example of the invention. A liquid crystal material with a dielectric anisotropy $\Delta\epsilon$ of 11.2, a nematic-isotropic transition point $T_{ni}$ of 75° C., and a refractive index anisotropy $\Delta n$ of 0.120 was used. The angle β defined by the lengthwise direction of the pixel electrode and the common electrode and the initial alignment direction of the liquid crystal in the liquid crystal layer 15 was set to 15°, the thickness T of the silicon nitride layer formed between the pixel electrode and the common electrode was set to 0.3 μm, and the cell gap d was set to 2.4 μm. In case where the white voltage $V_{white}$ is set to 5.5 V, the interval L between the electrodes which is acquired from the expression 12 lies in a range of exceeding 5.7 μm and less than 8.3 μm. In this example, therefore, the pixel size was set to 79.5 μm lateral and 238.5 μm longitudinal, the widths of the pixel electrode and the common electrode was set to 3.5 μm, and the interval L between the electrodes was set to 7 μm so that the electrodes could be laid out most efficiently under the conditions of the parameters. The characteristics of the liquid crystal display device, when operated with the white voltage $V_{white}$ set to 5.5 V, were examined. The results are shown in Table 4 below.

TABLE 4

| liquid crystal | nematic-isotropic transition point ($T_{ni}$) | 75° C. |
|---|---|---|
| | refractive index anisotropy (Δn) | 0.120 |
| | dielectric anisotropy (Δε) | 11.2 |
| | rotational viscosity coefficient ($\gamma_1$) | 90 mPa·sec |
| cell gap (d) | | 2.4 μm |
| interval between pixel electrode and common electrode (L) | | 7.0 μm |
| angle defined by the lengthwise direction of electrodes and the alignment direction of liquid crystal (β) | | 15° |
| thickness of silicon nitride layer (T) | | 0.3 μm |
| VI peak voltage ($V_{max}$) | | 5.7 V |
| white voltage ($V_{white}$) | | 5.5 V |
| response speed (τ) | | $11.9 \times 10^{-3}$ sec |
| response time to switch from black display to white display ($\tau_{on}$) | | $5.7 \times 10^{-3}$ sec |
| response time to switch from white display to black display ($\tau_{off}$) | | $6.2 \times 10^{-3}$ sec |

In the liquid crystal display device according to the example, the transmittance increased as the voltage increased, and the transmittance became the maximum when the applied voltage was 5.2 V. The proportionality coefficient A then was 11.12. Therefore, the white voltage $V_{white}$ in the example is equivalent to 96% of the voltage that maximizes the transmittance or the VT peak voltage $V_{max}$. Accordingly, the transmittance of the liquid crystal display device according to the example showed a high value of 99.2% of the maximum transmittance. Further, as shown in Table 4, the response time $\tau_{on}$ for the liquid crystal to switch from black display to white display was $5.7 \times 10^{-3}$ sec and the response time $\tau_{off}$ for the liquid crystal to switch from white display to black display was $6.2 \times 10^{-3}$ sec in the liquid crystal display device according to the example. Therefore, the response speed $\tau$ or the sum of those two response times became $11.9 \times 10^{-3}$ sec, significantly smaller than $15 \times 10^{-3}$ sec at which good video images could be obtained, achieving an extremely good video display performance.

What is claimed is:

1. A method of manufacturing a liquid crystal display device comprising the steps of:

providing an insulating layer on a first substrate, forming a common electrode and a pixel electrode in parallel to each other on said insulating layer, then forming a first alignment layer, subjected to an aligning treatment in a direction which forms an angle of 10 to 20° with a lengthwise direction of said pixel electrode and said common electrode, in such a way as to cover said insulating layer, said pixel electrode and said common electrode;

forming a second alignment layer, subjected to an aligning treatment in a direction which forms an angle of 10 to 20° with said lengthwise direction of said pixel electrode and said common electrode, on said second substrate; and arranging said first substrate and said second substrate to face each other in such a way that a distance between said first alignment layer and said second alignment layer becomes equal to or less than 2.7 µm, and arranging a liquid crystal having a dielectric anisotropy of 8 to 20 between said first alignment layer and said second alignment layer, wherein when a voltage of 4 to 7 V is applied to said pixel electrode at a time of displaying white, said voltage $V_{white}$ (V) to be applied to said pixel electrode when displaying white, said dielectric anisotropy $\Delta\varepsilon$ of said liquid crystal, said distance d (µm) between said first alignment layer and said second alignment layer, and an interval L (µm) between said pixel electrode and said common electrode satisfy a following expression.

$$11.8 > \frac{V_{white}}{d^{-0.6} \times L^{0.5} \times \Delta\varepsilon^{-0.5}} > 9.8.$$

2. The method according to claim 1, wherein said pixel electrode and said common electrode are formed by a transparent conductive layer.

3. The method according to claim 2, wherein said transparent conductive layer is an indium-tin oxide layer.

* * * * *